United States Patent
Jin et al.

(10) Patent No.: US 9,960,434 B2
(45) Date of Patent: May 1, 2018

(54) FUEL CELL

(71) Applicants: HYUNDAI MOTOR COMPANY, Seoul (KR); KIA MOTORS CORPORATION, Seoul (KR)

(72) Inventors: Sang Mun Jin, Yongin-si (KR); Yoo Chang Yang, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 133 days.

(21) Appl. No.: 15/145,463

(22) Filed: May 3, 2016

(65) Prior Publication Data

US 2017/0194658 A1 Jul. 6, 2017

(30) Foreign Application Priority Data

Jan. 6, 2016 (KR) .................. 10-2016-0001420

(51) Int. Cl.
*H01M 8/02* (2016.01)
*H01M 8/0258* (2016.01)
*H01M 8/0276* (2016.01)

(52) U.S. Cl.
CPC ....... *H01M 8/0258* (2013.01); *H01M 8/0276* (2013.01)

(58) Field of Classification Search
CPC .................. H01M 8/0258; H01M 8/0276
See application file for complete search history.

(56) References Cited

U.S. PATENT DOCUMENTS

2011/0033782 A1* 2/2011 Chin .................. H01M 8/0206
429/510

FOREIGN PATENT DOCUMENTS

| JP | 2003-077495 A | 3/2003 |
| JP | 2006-012466 A | 1/2006 |
| JP | 2007-207744 A | 8/2007 |
| JP | 2015-092446 A | 5/2015 |
| KR | 10-2011-0015924 A | 2/2011 |

OTHER PUBLICATIONS

Notice of Allowance dated Jan. 18, 2017, issued in Korean Patent Application No. 10-2016-0001420.

* cited by examiner

*Primary Examiner* — Gregg Cantelmo
(74) *Attorney, Agent, or Firm* — McDermott Will & Emery LLP

(57) ABSTRACT

A fuel cell includes a separator plate including manifold holes formed in opposite sides thereof, a plurality of flow-path lands protruding between the manifold holes, a plurality of flow-path channels between the flow-path lands, and a plurality of communication holes formed between ends of the flow-path channels and the manifold holes, and a gasket coupled to the separator plate, and a plurality of separating portions protruding from the blocking portion into gaps between the neighboring communication holes so as to separate the communication holes from one another, wherein ends of the flow-path lands that do not face the separating portions extend toward the communication holes farther than do ends of the flow-path lands that face the separating portions.

10 Claims, 7 Drawing Sheets

FUEL CELL

CROSS-REFERENCE TO RELATED APPLICATION

This application claims the benefit of priority to Korean Patent Application No. 10-2016-0001420, filed on Jan. 6, 2016 with the Korean Intellectual Property Office, the disclosure of which is incorporated herein by reference.

TECHNICAL FIELD

The present disclosure relates to fuel cells and, more particularly, to fuel cells capable of preventing condensed water from being stagnant in the bottom.

BACKGROUND

As illustrated in FIGS. 1 and 2, separator plates 100, to which thin reaction membranes 200 of a fuel cell are secured, are generally provided on opposite sides thereof with manifold holes 110.

Among these, an air supply manifold 111 located at one side serves to supply oxygen and hydrogen, which serve as fuels of the fuel cell, and an air discharge manifold 112 located at the other side serves to discharge air and water remaining after a reaction.

The thin reaction membrane 200 consists of a gas diffusion layer (GDL) and a membrane electrode assembly (MEA). The separator plates 100 serve to secure the thin reaction membranes 200, and are configured to form flow-path channels 320 through which fuel and cooling water flow. The separator plates 100 take the form of a stack of anode separator plates 100b and cathode separator plates 100a, alternately stacked one above another.

The flow-path channels 320 are spaces defined between flow-path lands 310 formed on the surface of the separator plate 100. The flow-path lands 310 take the form of protrusions, and serve not only as a passage through which electricity generated by a chemical reaction moves, but also to form the outer rims of the flow-path channels 320.

As illustrated in FIGS. 4A and 4B in greater detail, an entrance/exit structure is located between the manifold holes 110 and the flow-path channels 320 so as to enable communication of the two with each other. The fuel supplied through the manifold holes 110 is introduced into the flow-path channels 320 through a plurality of communication holes 140, which are formed in the separator plate 100.

Dual gaskets 120 and 130 include respective blocking portions 121 and 131, which are installed between the manifold holes 110 and the communication holes 140 formed in the separator plate 100, and respective separating portions 122 and 132, which are installed between the communication holes 140. The gaskets 120 and 130 serve as a support body between the separator plates 100 stacked one above another.

To assist the understanding of the entrance/exit structure described above, FIG. 2 illustrates a plan sectional view of the fuel cell. The anode separator plate 100b and the cathode separator plate 100a are arranged close to each other with the thin reaction membrane 200 interposed therebetween. The fuel, introduced through the air supply manifold 111, passes through the passage, which is supported by the gaskets 120 and 130 and support members 150, and the communication holes 140, and is then introduced into the flow-path channels 320. Conversely, air and water, discharged from the flow-path channels 320, pass through the communication holes 140, and are then discharged through the air discharge manifold 112.

In the entrance/exit structure, parallel boundary portions are present between the gaskets 120 and 130 and the flow-path channels 320. This is because the separator plate 100 requires space for the installation of molds in order to provide the separator plate 100, which is formed of a metal, with the gaskets via integral injection molding. To this end, flat portions having a length of about 1 mm or more need to be formed between the flow-path channels 320 and the ends of the separating portions 122 and 132 of the gaskets 120 and 130.

FIG. 3 illustrates an image of neutrons inside the fuel cell that is operating. The neutrons appear brighter as the concentration of water molecules increases and appear darker as the concentration of water molecules decreases.

As illustrated in FIG. 3, the reason why the amount of water generated by a chemical reaction increases with decreasing distance from the left side (the entrance) to the right side (the exit) is that the amount of water generated by the reaction of fuel increases. In addition, water is collected into and pools in the lower end due to gravity. As can be appreciated from the figure of an exit hole represented by the bright color in the lower right-hand corner of FIG. 3, water may be excessively accumulated and may not be properly discharged through the exit hole, and consequently air may not be properly discharged due to the accumulated water, thus causing problematic electricity generation.

When the water is not properly discharged, the supply of electric power may become problematic and the thin reaction membrane may be exposed to water for a long time, leading to a possible deterioration in performance.

In the related art, the flat portions described above are arranged above one another in the form of a straight line, which causes water to easily fall down and collect at the exit hole, located at the lower end of the structure.

This problem occurs in the entrance portion as well as in the exit portion of the fuel cell described above. Humidified fuel is generally supplied in order to improve the performance of the fuel cell. At this time, condensed water may be introduced into the reaction plane, and the condensed water introduced through the manifold may be collected into a lower flow path through the flat portions between the flow-path channels and the gaskets.

Therefore, there is a demand for a fuel cell having an entrance/exit structure capable of preventing water from collecting at an exit hole located at a lower end of the structure.

SUMMARY OF THE DISCLOSURE

Therefore, the present disclosure has been made in view of the above problems, and it is an object of the present disclosure to provide a fuel cell having an entrance/exit structure capable of preventing water flowing inside the fuel cell from collecting at the lowermost end.

In accordance with one aspect of the present disclosure, the above and other objects can be accomplished by the provision of a fuel cell including a separator plate including manifold holes formed in opposite sides thereof, a plurality of flow-path lands protruding between the manifold holes, a plurality of flow-path channels between the flow-path lands, and a plurality of communication holes formed between ends of the flow-path channels and the manifold holes so as to be spaced apart from one another by a given distance, and a gasket coupled to the separator plate, the gasket including a blocking portion, located between the manifold holes and the communication holes so as to block a gap between the manifold holes and the communication holes, and a plurality of separating portions protruding from the blocking portion into gaps between the neighboring communication holes so as to separate the communication holes from one another, wherein ends of the flow-path lands that do not face the separating portions extend toward the communication holes farther than ends of the flow-path lands that face the separating portions.

The manifold hole located at one side may be an air supply manifold, and the manifold hole located at a remaining side is an air discharge manifold.

The ends of the flow-path lands that do not face the separating portions may extend toward the communication holes in the air discharge manifold, among the air supply manifold and the air discharge manifold, farther than the ends of the flow-path lands that face the separating portions.

The separator plate may be oriented perpendicular to a ground surface, and the air discharge manifold may be formed in a lower end of the separator plate.

One end of each separating portion may be located between one end of the flow-path land that does not face the separating portion and one end of the flow-path land that faces the separating portion.

One end of each separating portion may extend so as to be close to one end of the flow-path land that faces the separating portion.

Each separating portion may face one flow-path land, and each communication hole may be connected to the flow-path channels between the neighboring separating portions.

The gasket may surround three sides of each communication hole via the blocking portion and the separating portions located at opposite sides of the communication hole.

One end of each separating portion may be located close to one end of the flow-path land that faces the separating portion, one of the end of the separating portion and the end of the flow-path land having a convex shape and the remaining one thereof having a concave shape corresponding to the convex shape.

One end of each separating portion may be located close to one end of the flow-path land that faces the separating portion, the end of the separating portion having a convex shape and the end of the flow-path land having a concave shape corresponding to the convex shape.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Technical terms used herein are simply given to mention specific embodiments, and are not intended to limit the present disclosure. As used herein, the singular forms are intended to include the plural forms as well, unless the context clearly indicates otherwise. It will be further understood that the term "includes" when used in this specification, specify the presence of stated features, regions, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Hereinafter, a fuel cell in accordance with an exemplary embodiment of the present disclosure will be described with reference to the accompanying drawings.

Figure 1:
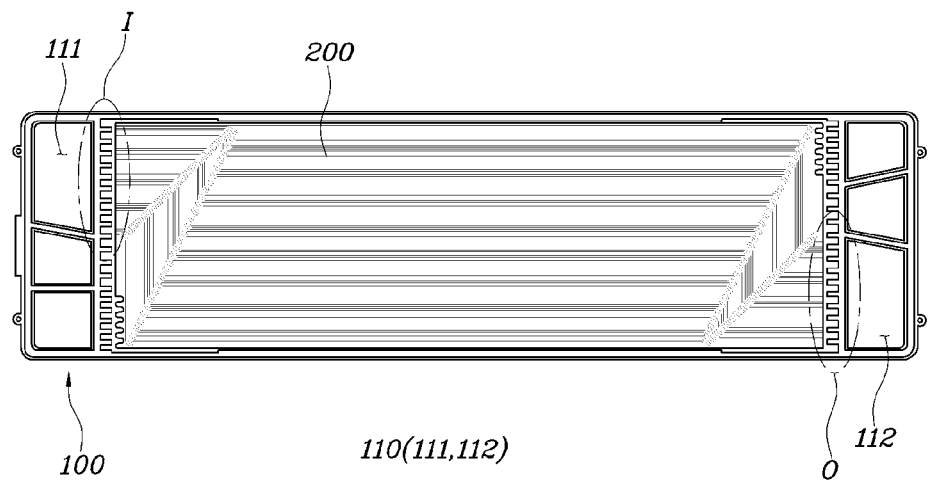
FIG. 1 is a view illustrating a conventional fuel cell.
Figure 2:
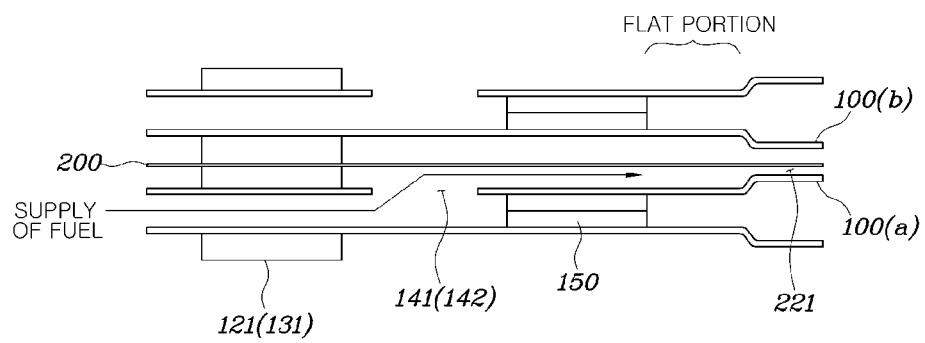
FIG. 2 is a plan sectional view of the conventional fuel cell.
Figure 3:
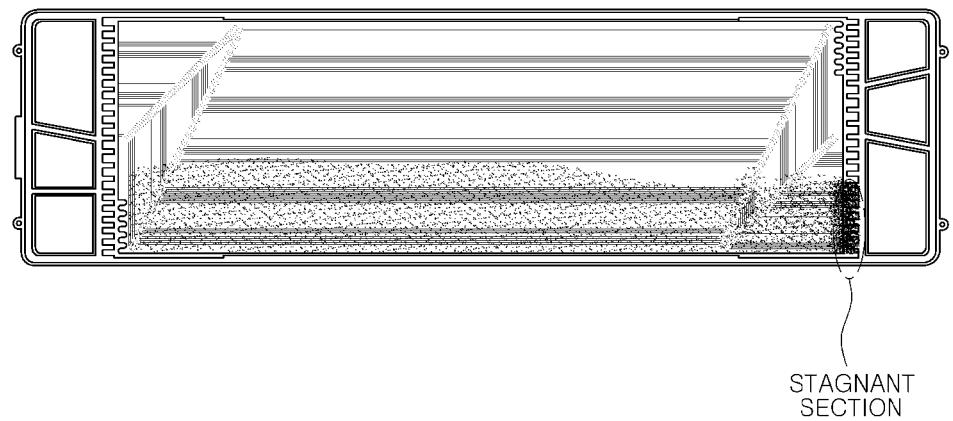
FIG. 3 is an image of neutrons in the conventional fuel cell that is operating.
Figure 4A:
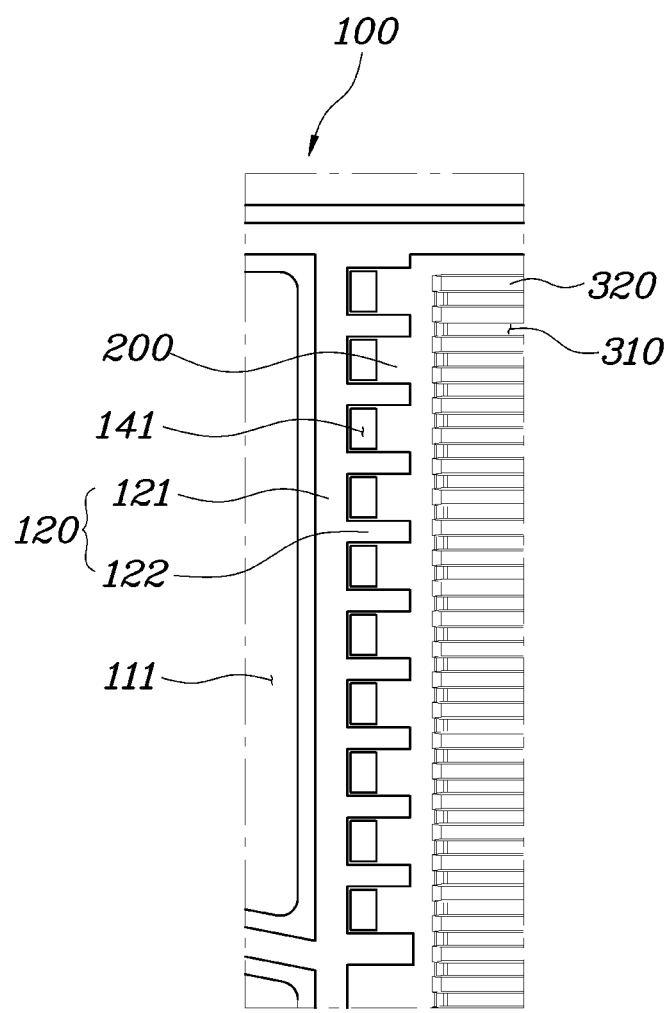
FIGS. 4A and 4B are enlarged views illustrating an entrance portion and an exit portion of the conventional fuel cell.
Figure 4B:
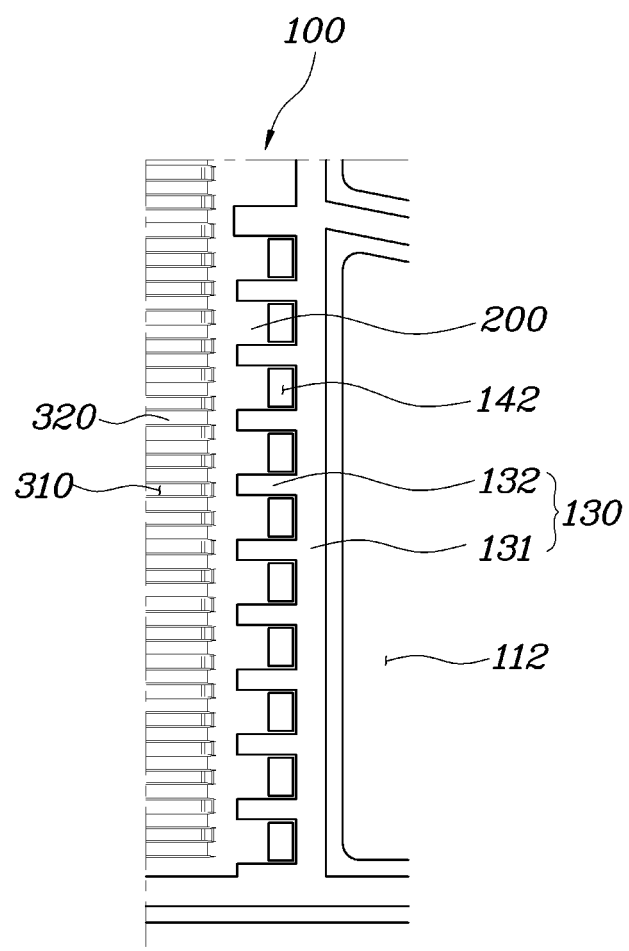
Figure 5A:
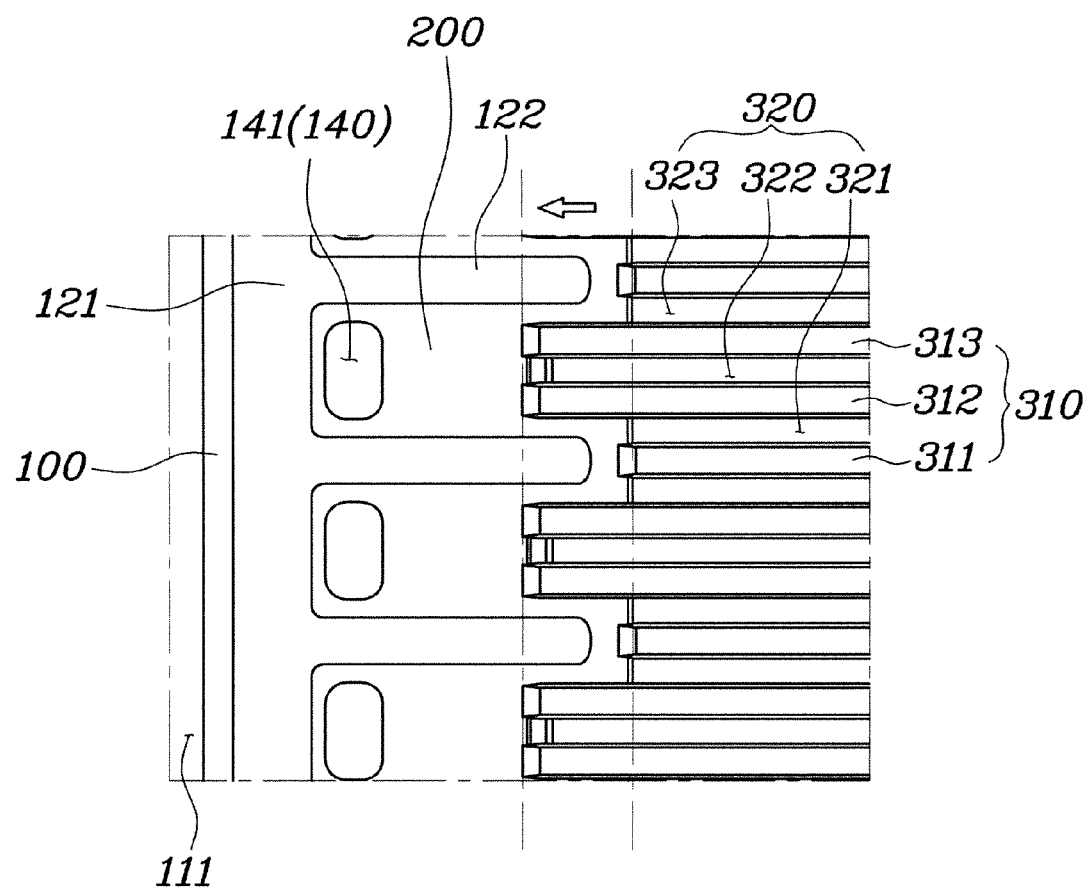
FIGS. 5A and 5B are enlarged views illustrating an entrance portion and an exit portion of a fuel cell in accordance with one embodiment of the present disclosure.
Figure 5B:
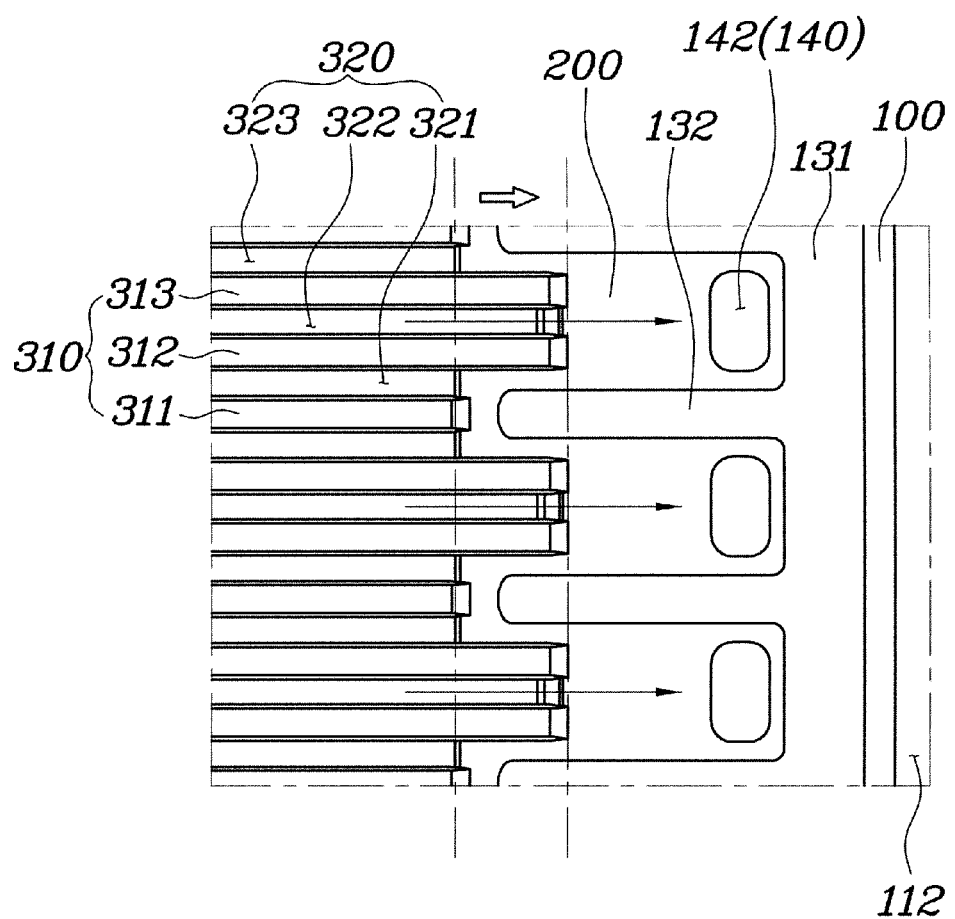

Referring to FIGS. 1, and 5A and 5B, illustrating the approximate shape of the fuel cell in accordance with the present disclosure, the fuel cell may include a separator plate 100 provided on opposite sides thereof with manifold holes 110, and gaskets 120 and 130 installed on the separator plate 100.

Although a plurality of separator plates 100 are stacked one above another, only one separator plate 100 is illustrated in the drawings. Thin reaction membranes 200 may be installed between the separator plates 100 and serve to generate electricity using oxygen and hydrogen.

The separator plate 100 may have a convex/concave shape such that concave flow-path channels 320 are formed between convex flow-path lands 310. In addition, communication holes 140 may be formed at opposite ends of the flow-path channels 320. The communication holes 140 may be classified into entrance holes 141, into which fuel is supplied from an air supply manifold 111, and exit holes 142, from which air and water are discharged to an air discharge manifold 112.

The fuel supplied through the entrance holes 141 reacts with the thin reaction membranes 200 while flowing through the flow-path channels 320 so as to generate electricity and water. Thereafter, the water is discharged through the exit holes 142.

The respective gaskets 120 and 130 may be divided into blocking portions 121 and 131 and separating portions 122 and 132. The blocking portions 121 and 131 may include an entrance blocking portion 121, installed to block the gap between the air supply manifold 111 and the entrance holes 141, and an exit blocking portion 131, installed to block the gap between the air discharge manifold 112 and the exit holes 142. The separating portions 122 and 132 may include entrance separating portions 122 installed between the neighboring entrance holes 141, and exit separating portions 132 installed between the neighboring exit holes 142. In this case, the blocking portions 121 and 132 and the separating portions 122 and 132 may be integrally formed with each other from the same material. This may serve to prevent damage caused by differences in, for example, strength, adhesive force, and thermal expansion rate between the gaskets 120 and 130.

The entrance gasket 120, which may include the entrance blocking portion 121 and the entrance separating portions 122, and the exit gasket 130, which includes the exit blocking portion 131 and the exit separating portions 132, may be separate gaskets or may be integrally formed with each other.

A possible aspect of the present disclosure is that the flow-path lands 310 that do not face the separating portions 122 and 132 are longer than the flow-path lands 310 that face the separating portions 122 and 132. That is, by allowing the ends of the flow-path channels 320 formed by the longer flow-path lands 310 to be closer to the communication holes 140, even if water discharged from the flow-path channels 320 falls down due to gravity, the separating portions 122 and 132 prevent the fall of water, causing the water to be discharged through the exit holes 142.

Since the fall of water occurs particularly well in the vicinity of the air discharge manifold 112, the configuration in accordance with the present disclosure in which some flow-path lands 310 are longer than others may be applied to the flow-path lands 310 that face the exit separating portions 132 installed in the vicinity of the exit holes 142. Of course, the present disclosure is not limited thereto, and the above-described configuration in accordance with the present disclosure may be applied to the flow-path lands 310 that face the entrance separating portions 122 installed in the vicinity of the entrance holes 141.

Considering the above-described configuration in more detail, as illustrated in FIGS. 5A and 5B, assuming that the flow-path land 310, installed to face the entrance separating portion 122 or the exit separating portion 132 at the same height, is referred to as a first land 311, and that a second land 312 and a third land 313 are sequentially formed above the first land 311, the second land 312 and the third land 313 may be longer than the first land 311. In addition, another first land 311 may be formed above the third land 313 so as to face another separating portion 122 or 132, which is formed above the aforementioned separating portions 122 and 132.

In addition, the flow-path channel 320 formed between the first land 311 and the second land 312 may be referred to as a first channel 321, the flow-path channel 320 formed between the second land 312 and the third land 313 may be referred to as a second channel 322, and the flow-path channel 320 formed between the third land 313 and the first land 311 may be referred to as a third channel 323.

In this case, the end of the second channel 322, rather than the ends of the first channel 321 and the third channel 323, may be closer to the corresponding communication hole 140, and the second channel 322 may be formed at the same height as the communication hole 140.

Figure 6A:
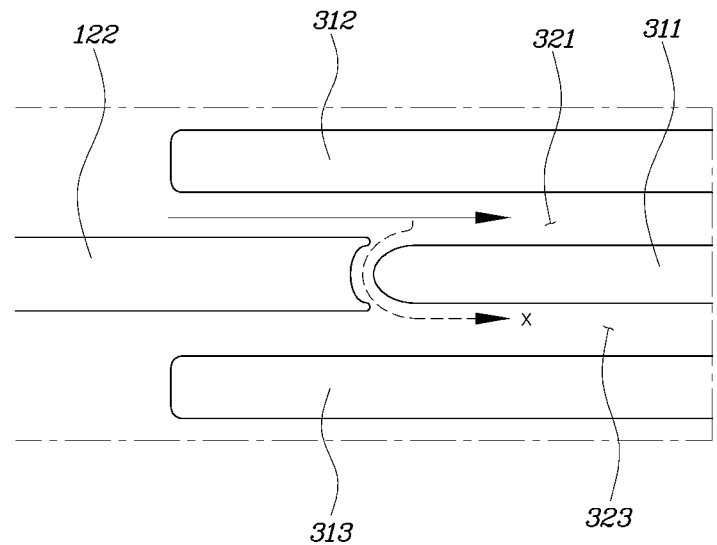
FIGS. 6A and 6B are enlarged views illustrating a first land and a separating portion close to each other in a fuel cell in accordance with an embodiment of the present disclosure.
Figure 6B:
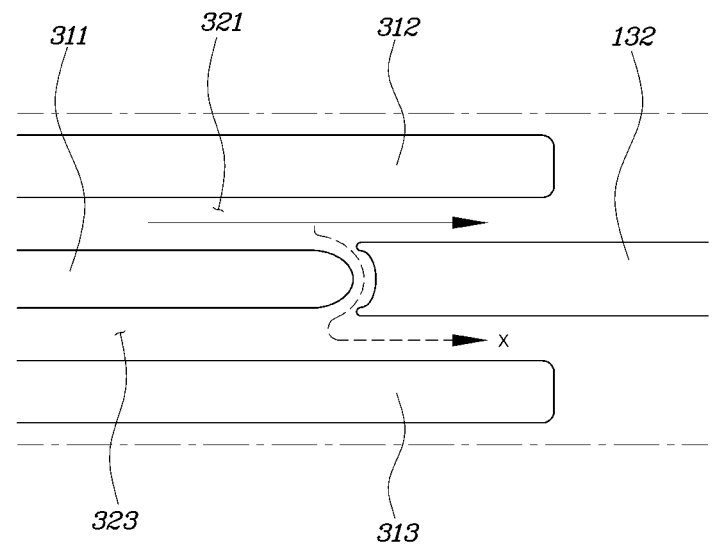

As illustrated in FIGS. 6A and 6B, the third channel 323 may be formed as the space between the upper surface of the third land 313 and the lower surface of the first land 311, and the first channel 321 may be formed as the space between the upper surface of the first land 311 and the lower surface of the second land 312.

The first land 311 may be located close to the separating portion 122 or 132 while facing thereto so that the space between the first land 311 and the separating portion 122 or 132 is minimized, which may prevent water from moving downward through this space. In addition, the separating portion 122 or 132 and the first land 311 may be shaped to correspond to each other, one of them having a convex shape and the other one having a concave shape. With this configuration, air and water flowing through the flow-path channel 320 cannot move downward unless they move counter to the flow thereof. In this way, it is possible to minimize the concentration of water on the lower side of the fuel cell. The facing surfaces of the two may be smooth, or may be formed to define a zigzag path so as to make the flow of water difficult.

Accordingly, since the fuel or water cannot move to other channels unless they move by a longer distance in the direction opposite the original flow direction thereof, it may be possible to prevent the fuel and water from moving to other channels, i.e. lower channels.

Although the first land 311 may be shorter than the second land 312 and the third land 313, the upper surface of the third channel 323 and the lower surface of the first channel 321 may be prolonged by the separating portion 122 or 132 installed to face the first land 311, thereby causing the fluid flowing through the flow-path channel 320 to be distributed to the respective communication holes 140.

In this way, three flow-path channels 320 are allotted to each communication hole 140 so that the same amount of fluid passes through the respective communication holes 140, which may more effectively prevent the concentration of water as described above.

All of the configurations mentioned above may be required because the separator plate 100 is oriented perpendicular to the ground surface. That is, this is because the water moves downward through the space between the separating portions 122 and 132 and the flow-path lands 310 of the vertically oriented separator plate 100. In addition, by arranging the air discharge manifold 112 at the lower side, it is possible to ensure the easier discharge of water and to prevent the water from collecting at the lowermost end.

As is apparent from the above description, a fuel cell according to the present disclosure has the following effects.

First, it is possible to prevent condensed water inside the fuel cell from collecting in the lower region of the fuel cell, which may increase the efficiency with which the fuel cell generates electricity and may also increase the lifespan of the fuel cell.

Second, it is possible to distribute the positions of distal end surfaces of channels formed in the ends of the separator plates, which may result in improved processing ability.

Although the preferred embodiments of the present disclosure have been described above with reference to the accompanying drawings, those skilled in the art will appreciate that the present disclosure can be implemented in various other embodiments without changing the technical ideas or features thereof.

Hence, it should be understood that the embodiments described above are given by way of example in all aspects and are not intended to limit the present disclosure. The scope of the present disclosure should be defined by the claims, rather than the detailed description, and all modifications or modified forms derived from the meaning and scope of the claims and equivalents thereof should be construed as falling within the scope of the present disclosure.

What is claimed is:

1. A fuel cell including:
   a plurality of separator plates laminated;
   a plurality of membrane electrode assembly mounted between two adjacent separator plates; and
   a plurality of gaskets mounted between two the adjacent separator plates, wherein the plurality of separator plates each include manifold holes disposed in opposite sides thereof, a plurality of flow-path lands protruding between the manifold holes, a plurality of flow-path channels between the flow-path lands, and a plurality of communication holes disposed between ends of the flow-path channels and the manifold holes so as to be spaced apart from one another by a given distance;

wherein the plurality of gaskets coupled to the plurality of separator plates, the plurality of gaskets each include a blocking portion located between the manifold holes and the communication holes so as to block a gap between the manifold holes and the communication holes, and a plurality of separating portions protruding from the blocking portion into gaps between the neighboring communication holes so as to separate the communication holes from one another, and wherein ends of the flow-path lands that do not face the separating portions extend toward the communication holes farther than do ends of the flow-path lands that face the separating portions.

2. The fuel cell according to claim 1, wherein the manifold hole located at one side is an air supply manifold, and the manifold hole located at a remaining side is an air discharge manifold.

3. The fuel cell according to claim 2, wherein the ends of the flow-path lands that do not face the separating portions extend toward the communication holes in the air discharge manifold, among the air supply manifold and the air discharge manifold, farther than do the ends of the flow-path lands that face the separating portions.

4. The fuel cell according to claim 3, wherein each of the plurality of separator plates is oriented perpendicular to a ground surface, and the air discharge manifold is disposed in a lower end of each of the plurality of separator plates.

5. The fuel cell according to claim 1, wherein one end of each separating portion is located between one end of the flow-path land that does not face the separating portion and one end of the flow-path land that faces the separating portion.

6. The fuel cell according to claim 1, wherein one end of each separating portion extends so as to be close to one end of the flow-path land that faces the separating portion.

7. The fuel cell according to claim 1, wherein each separating portion faces one flow-path land, and each communication hole is connected to the flow-path channels between the neighboring separating portions.

8. The fuel cell according to claim 1, wherein each of the plurality of gaskets surrounds three sides of each communication hole via the blocking portion and the separating portions located at opposite sides of the communication hole.

9. The fuel cell according to claim 1, wherein one end of each separating portion is located close to one end of the flow-path land that faces the separating portion, one of the end of the separating portion and the end of the flow-path land having a convex shape and the remaining one thereof having a concave shape corresponding to the convex shape.

10. The fuel cell according to claim 1, wherein one end of each separating portion is located close to one end of the flow-path land that faces the separating portion, the end of the separating portion having a convex shape and the end of the flow-path land having a concave shape corresponding to the convex shape.

* * * * *